United States Patent [19]

Liedermooy et al.

[11] Patent Number: 5,670,566
[45] Date of Patent: Sep. 23, 1997

[54] COOL-APPLIED HOT MELT ADHESIVE COMPOSITION

[75] Inventors: Ingrid Liedermooy, Somerville; Daniel C. Stauffer, Flemington; Paul P. Puletti, Pittstown, all of N.J.

[73] Assignee: National Starch and Chemical Investment Holding Corporation, Wilmington, Del.

[21] Appl. No.: 369,244

[22] Filed: Jan. 6, 1995

[51] Int. Cl.$^6$ .................................................... C08L 91/06
[52] U.S. Cl. ........................ 524/271; 524/275; 524/277; 524/481; 524/487; 524/489
[58] Field of Search .................................. 524/271, 275, 524/277, 480, 481, 487, 489

[56] References Cited

U.S. PATENT DOCUMENTS

| | | | |
|---|---|---|---|
| 3,615,106 | 10/1971 | Flanagan et al. | 524/271 |
| 3,884,786 | 5/1975 | Domine et al. | 204/159.14 |
| 4,070,316 | 1/1978 | Combs et al. | 260/28.5 |
| 4,146,521 | 3/1979 | Godfrey | 260/27 R |
| 4,167,433 | 9/1979 | Lakshmanan | 156/322 |
| 4,404,299 | 9/1983 | Decroix | 524/77 |
| 4,434,261 | 2/1984 | Brugel et al. | 524/109 |
| 4,460,728 | 7/1984 | Schmidt, Jr. et al. | 524/271 |
| 4,471,086 | 9/1984 | Foster | 524/489 |
| 4,500,661 | 2/1985 | Lakshmanan | 524/77 |
| 4,567,223 | 1/1986 | Ames | 524/489 |
| 4,631,308 | 12/1986 | Graham et al. | 524/272 |
| 4,752,634 | 6/1988 | Goss | 524/271 |
| 4,816,306 | 3/1989 | Brady et al. | 428/36.92 |
| 4,874,804 | 10/1989 | Brady et al. | 524/100 |
| 5,210,150 | 5/1993 | Prejean | 525/100 |
| 5,310,803 | 5/1994 | Hansen | 525/228 |
| 5,331,033 | 7/1994 | Stauffer et al. | 524/275 |
| 5,373,049 | 12/1994 | Ornstern et al. | 524/487 |

FOREIGN PATENT DOCUMENTS

| | | |
|---|---|---|
| 0 078 122 B1 | 5/1983 | European Pat. Off. . |
| 0 547 799 A1 | 6/1993 | European Pat. Off. . |
| 0 547 797 A1 | 6/1993 | European Pat. Off. . |
| 0 547 798 A1 | 6/1993 | European Pat. Off. . |
| WO 94/12584 | 6/1994 | WIPO .................. C09J 123/08 |

OTHER PUBLICATIONS

Skeist, Irving PhD Handbook of Adhesives, 3rd ed. Van Nostrand Reinhold NY 1990 pp. 408–414.

*Primary Examiner*—Jeffrey T. Smith
*Attorney, Agent, or Firm*—Ellen T. Dec

[57] ABSTRACT

A carton, case or tray formed utilizing a hot melt adhesive composition said adhesive consisting essentially of a) 10 to 60% by weight of at least one ethylene n-butyl acrylate copolymer containing 25 to 45% by weight n-butyl acrylate and having a melt index of at least about 850; b) 20 to 60% of a rosin ester tackifying resin; c) 10 to 50% by weight of a microcrystalline or paraffin wax having a melting point of 150° to 200° F.; d) 1 to 20% by weight of a polymeric additive selected from the group consisting of ethylene vinyl acetate containing 10 to 40% by weight vinyl acetate, ethylene methyl acrylate polymers containing 10 to 28% methyl acrylate, ethylene acrylic acid copolymers having an acid number of 25 to 150, polyethylene, polypropylene, poly-(butene-1-co-ethylene), and lower melt index ethylene n-butyl acrylate copolymers; and e) 0 to 1.5% stabilizer, said adhesive characterized by a viscosity of less than 3000 cps at 135° C., fiber tearing bonds from within the range of −35° to 40° C.

12 Claims, No Drawings

COOL-APPLIED HOT MELT ADHESIVE COMPOSITION

BACKGROUND OF THE INVENTION

Hot melt adhesives are widely used in industry for various applications such as product assembly and packaging, including particularly, for use in cardboard case sealing and carton closing operations. Some of these operations (e.g., for cartons, cases or trays used in packaging of frozen foods such as ice cream or pizza) where such packages will be stored at 30° to −35° C. require a hot melt adhesive with exceptionally good cold resistance (i.e., ability to maintain a high strength bond in the cold with no tendency to fracture). Further, the viscosity of such adhesives must be low enough and the set speed fast enough to give good machinability, for example, on rapid-fire, automatic equipment with short compression sections which are used in commercial case or carton operations. The thermal stability and aesthetics also must be such as to produce no charring, skin, or gel formation coupled with a small viscosity change following prolonged aging at typical operating temperatures (e.g., 200° C.) so as to minimize down time for maintenance and to provide consistent application patterns and amounts during operation. These aesthetic considerations have become more important in recent years as customers increasingly demand hot melt adhesives having pot clarity, i.e., adhesives which are clear in their molten form.

Hot melt case and carton sealing products available and in commercial use today (primarily polyethylene and ethylene vinyl acetate formulations) lack one or more of the previously described properties; (1) high temperature end use performance; (2) low temperature end use performance; (3) clean machining; (4) low viscosity; (5) desirable aesthetics (clarity); (6) satisfactory thermal stability; (7) and/or low cloud point (below 120° C.). It would therefore be an advance in the art to provide another hot melt adhesive having good bond strengths (i.e., producing fiber tear) at exceptionally low temperatures coupled with low viscosity, fast set speed and excellent thermal stability, machining and aesthetics.

U.S. Pat. Nos. 4,816,306 and 4,874,804 to Brady, et al., disclose that hot melt packaging adhesive compositions consisting essentially of 35 to 45% by weight of an ethylene n-butyl acrylate copolymer containing 25 to 45% by weight n-butyl acrylate and having a melt index of at least 50; 35 to 55% of a terpene phenolic tackifier; and 10 to 20% by weight of a high melting point synthetic wax provide adhesives characterized by an excellent balance of high and low temperature performance without sacrifice to its machinability or thermal stability.

It has also been taught in commonly-assigned U.S. Pat. No. 5,331,033 that the problems encountered by the adhesives described in the U.S. Pat. Nos. 4,816,306 and 4,874,804 can be overcome by the use of an adhesive consisting essentially of 20 to 50% by weight of an ethylene n-butyl acrylate copolymer containing 25 to 45% by weight, preferably 30 to 40%, n-butyl acrylate and having a melt index of at least 10; 30 to 60% of an aliphatic or cycloaliphatic (alicyclic) petroleum hydrocarbon resin or hydrogenated derivative thereof or a hydrogenated aromatic petroleum hydrocarbon resin and 10 to 30% by weight of a high melting point synthetic wax. The adhesives of that application were characterized by good thermal and rheological properties. Moreover, the adhesives had a density less than about 0.98 which enabled them to be readily separated from the pulp using conventional filtering operations.

Most commercially available hot melt adhesives, including those discussed above, require temperatures of 350° F. or greater to ensure complete melting of all the components and also to achieve satisfactory application viscosity. The need for such elevated temperatures is not without problems. Thus, the high temperatures increase the operator's risks with respect both to burns and to inhalation of residual volatiles. Finally, the high temperatures require more energy, placing greater demands on the manufacturing facility.

It would be beneficial if hot melt adhesives could be prepared which would provide superior case and carton bonds which maintain their integrity when the case and/or carton are exposed to low temperature environments yet which are characterized by suitable application viscosity at lower temperatures and thus could be applied without encountering any of the previously described problems.

SUMMARY OF THE INVENTION

We have now found hot melt adhesives prepared from 10 to 60% by weight of an ethylene n-butyl acrylate copolymer containing 15 to 40% by weight n-butyl acrylate and having a melt index of at least about 850; 20 to 60% by weight of a rosin ester tackifier and 10 to 50% by weight of a microcrystalline or paraffin wax may be applied at relatively low temperatures of about 225° to 275° F. yet provide superior cold resistance making them eminently suitable for use on cases and cartons which are to be exposed to refrigeration or freezing during packaging, transport and/or storage. In particular, the adhesives of the present invention find applicability in the bonding of polyolefin laminated cases and cartons, substrates which are difficult to bond and wherein even the adhesives described in the aforementioned Brady et al. patents are deficient.

DETAILED DESCRIPTION OF THE PREFERRED EMBODIMENTS

The ethylene/n-butyl acrylate copolymers (EnBA) useful herein are those containing from about 15 to 40% by weight n-butyl acrylate and having a melt index of at least about 850, preferably at least about 900 (ASTM) D 1238 Condition E). The preferred copolymers are available from Exxon Chemical under the designation Escorene XW22 and contain approximately 33% by weight n-butyl acrylate and have a melt index of about 900. The amount of the copolymer present in the adhesive varies from 10 to 60% by weight, preferably 20 to 40% by weight.

The tackifying resins useful in the adhesive compositions are the rosin ester tackifiers including natural and modified rosins such, for example, as gum rosin, wood rosin, tall-oil rosin, distilled rosin, hydrogenated rosin, dimerized rosin, polymerized rosin, as well as the glycerol and pentaerythritol esters of natural and modified rosins, such, for example as the glycerol ester of pale wood rosin, the glycerol ester of hydrogenated rosin, the glycerol ester of polymerized rosin, the pentaerythritol ester of hydrogenated rosin and the phenolic-modified pentaerythritol ester of rosin. The tackifiers generally have melting points normally ranging from 10° to 120° C. Representative commercially available tackifiers include "Sylvatac" and "Zonester" from Arizona Chemical Company, "Permalyn" from Hercules, and "Unitac" from Union Camp. They are used in amounts of 20 to 60% by weight, preferably 20 to 40%.

The waxes suitable for use herein include the microcrystalline and paraffin waxes having melting points in the range of about 150° to 200° F. such as, for example, "Be Square" and "Bowax" from Petrolite, "Pacemaker" from Citco, and R-2540 from Moore and Munger. The wax component is utilized at levels of 10 to 50% by weight, preferably 20 to 30% by weight, of the adhesive.

The adhesives of the invention preferably also contain a stabilizer or antioxidant. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency, and correspondingly, its reactivity; this stearic hindrance thus providing the phenolic compound with its stabilizing properties. Representative hindered phenols include; 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites, particularly useful is distearylthiodipropionate. These stabilizers, if used, are generally present in amounts of about 0.1 to 1.5 weight percent, preferably 0.25 to 1.0%. Other additives such as plasticizers, pigments, dyestuffs conventionally added to hot melt adhesives for various end uses contemplated may also be incorporated in minor amounts into the formulations of the present invention.

In addition to the components described above, the adhesive compositions may also contain small amounts, i.e., up to about 20% by weight, of polymeric additives such as ethylene vinyl acetate polymers containing 10 to 40% by weight vinyl acetate; ethylene methyl acrylate polymers containing 10 to 28% by weight methyl acrylate; ethylene acrylic acid copolymers having an acid number of about 25 to 150; polyolefins such as polyethylene or polypropylene or poly(butene-1-co-ethylene) polymers as well as other ethylene n-butyl acrylate polymers having different melt indexes.

The adhesive compositions are prepared by blending the components in the melt at a temperature of about 100° to 150° C. until a homogeneous blend is obtained, approximately 2 hours. Various methods of blending are known to the art and any method that produces a homogeneous blend is satisfactory.

The resulting adhesives are characterized by viscosity of less than about 3000 cps at 135° C., with fiber tearing bonds from a variety of substrates within the complete temperature range of −35° C. to 40° C. Moreover, the adhesives may be applied at temperatures of 225° to 275° F. The adhesives find particular use as packaging adhesives, for example, for sealing cases and cartons which are to be exposed to extreme temperature conditions. The adhesives are especially adapted for use in the bonding of cases and cartons formed from substrates which are coated with polyolefins such as polyethylene, coatings which pose severe problems for most adhesive compositions, nonetheless for compositions which are applied at such low coating temperatures.

EXAMPLES

In the following examples which are provided for illustrative purposes only, all parts are by weight and all temperatures in degrees Celsius unless otherwise noted.

In the examples, all adhesive formulations were prepared in single blade mixer heated to 121° C. by blending the components until homogeneous.

The adhesives were then subjected to various tests simulating the properties needed for successful commercial applications.

Melt viscosities of the hot melt adhesives were determined on a Brookfield Model RVT Thermosel viscometer at the temperatures indicated using a number 27 spindle.

Test specimens for determining elevated temperature peel and shear strengths were prepared as follows: an adhesive bead ½ inch wide was applied at 121° C. to a strip of 50 pound Kraft paper 1 inch wide by 3 inches long across the width of the paper. A second piece of Kraft paper of the same dimensions was immediately placed over the first piece and 100 gram weight placed on top of the composite construction. The compressed adhesive bead width was 1 inch.

Elevated temperature peel and elevated temperature shear were determined by attaching a 100 gram weight to each specimen and placing the specimens in a forced-draft oven. The temperature was raised in 5.5° C. (10° F.) increments from 38° C. the specimens remained at a given temperature for 15 minutes for conditioning. The heating cycle was run until the final bond failed. Each peel and shear specimen was prepared and tested in duplicate. The elevated peel and shear value shown is the average temperature of failure for the two bonds. In some cases, the sample failed as the temperature was being adjusted within the 10° increments and is presented as such.

Adhesion at various temperatures, as noted, was determined by applying a ½ inch wide bead of adhesive at 121° C. widthwise to a 2 inch by 3 inch piece substrate (as indicated) and immediately bringing a second piece of the substrate into contact. A 200 gram weight was immediately placed on the construction. The boardstock was 275 pound burst strength corrugated board. The bond specimens were placed in an oven or freezer to obtain the desired test temperature and the bonds were separated by hand and a determination made as to the type of failure. The percentages indicate the amount of fiber tear across the extent of the bond. The character of the bond failure was also observed and, in the case of bonds which exhibited a brittle crack or shattering of the adhesive, this characteristic was noted as "cold crack".

The tack range was measured by drawing out a 3 mil thick adhesive film and then qualitatively measuring the degree of tack by determining how many finger prints could be made in the film before the film set.

The thermal stability of the adhesive blends was determined in the following manner: 100 grams of adhesive was placed in a clean 8 oz. glass jar and covered with aluminum foil. The jars were then placed in forced-draft ovens at 121° C. and aged covered for the time indicated. After this, the specimen was analyzed for the presence of char and non-thermoplastic material (skin or gel) and the viscosity measured. Unusual behavior such as separation and lack of clarity were also noted.

Clarity is determined qualitatively by heating the adhesive in a beaker to 121° C. and placing a thermometer in the beaker. If the thermometer could be fully seen, the adhesive was determined to be clear; if it could not, the thermometer was gradually moved toward the front of the beaker and a comparative rating was assigned.

| ADHESIVE COMPONENTS | 1 | 2 | 3 | 4 |
|---|---|---|---|---|
| EnBA (33% nBA, 900 MI) Escorene XW 22 | 34.5 | — | 34.5 | — |
| EnBA (33% VA, 300 MI) Escorene XW 23 | 2.5 | — | 2.5 | — |
| Ethylene acrylic acid copolymer (AC 540) | 11.5 | 11.5 | 11.5 | 11.5 |
| EVA (28% VA, 900 MI) Elvax 205 (Du Pont) | — | 34.5 | — | 34.5 |
| EVA (28% VA, 400 MI) Elvax 210 (Du Pont) | — | 2.5 | — | 2.5 |
| 150° F. Microcrystalline Wax (Bowax 845) | — | — | 24 | 24 |
| Tackifying Resin 40° C. Rosin Ester (Sylvatac 4ON) | 27.5 | 27.5 | 27.5 | 27.5 |
| 155° F. Paraffin Wax (Pacemaker 53) | 24 | 24 | — | — |
| Antioxidant Irganox 1010 (Ciba-Geigy) | 0.2 | 0.2 | 0.2 | 0.2 |
| Viscosity @ 250° F. (cps) | 1395 | 1625 | 1885 | 2335 |
| Viscosity @ 275° F. (cps) | 935 | 1035 | 1225 | 1335 |
| Cloud Point | 185 | 185 | 195 | 195 |
| Clarity | Clear | Clear | Clear | Clear |
| Ball and Ring Softening Point (°F.) | 187° | 184° | 204° | 202° |
| Peel (°F.) | Adj. 100 | Adj. 100 | Adj. 100 | Adj. 100 |
| Shear (°F.) | Adj. 160 | Adj. 160 | Adj. 180 | Adj. 160 |
| ADHESION (CORRUGATED) | | | | |
| RT | 100% | 100% | 80% soft | 80% soft |
| 40° F. | 100% | 100% | 100% | 100% |
| 20 | 100% | 100% | 100% | 100% |
| 0 | 100% | 100% cold crack | 100% | 75% cold crack |
| −30 | 100% | 100% cold crack | 100% | 75% cold crack |
| ADHESION (POLYETHYLENE LAMINATION) | | | | |
| RT | 100% | 100% | 100% | 50% |
| 40° F. | 100% | 100% | 100% | 75% |
| 20 | 100% | 75, 100% | 100% | 75% |
| 0 | 100% | 50% cold crack | 100% | 50% cold crack |
| −30 | 100% | 50% cold crack | 100% | 25% cold crack |
| THERMAL STABILITY (72 HOURS @ 250° F.) | | | | |
| Volatiles | None | None | None | None |
| Char | None | Slight | None | Slight |
| Gel | None | None | None | None |
| Separation | None | None | None | None |
| Edge Ring | None | None | None | None |
| Viscosity Change | +1.0% | +1.0% | +1.2% | +4.0% |
| THERMAL STABILITY (150 HOURS @ 250° F.) | | | | |
| Volatiles | None | None | None | None |
| Char | None | Slight | None | Slight |
| Gel | None | None | None | None |
| Separation | None | None | None | None |
| Edge Ring | None | None | None | None |
| Viscosity Change | +0.5% | +1.0% | +1.2% | +1.1% |

Cloud point is determined by heating the adhesive blends to 121° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other. Products that show cloud points near or at the softening point of the wax used in the formulation reflect an overall compatible product. The cloudiness that develops as the material cools is the result of the developing crystallinity of the waxy component (causing refraction of light passing through the sample). Systems which possess cloud points much greater than the softening point of the wax exhibiting a micro separation changing the refraction index of the molten adhesive. The practical significance of products with high cloud points are as follows:

(1) Poor inherent compatibility with a tendency to phase separation upon prolonged heating and heating and cooling cycling such as is experienced in commercial operations.

(2) Poor flow properties resulting in "stringing" from rapid fire, air actuated nozzle equipment.

The results presented in this example illustrates the superior properties, even on polyethylene laminated substrates, obtained by use of adhesives prepared in accordance with the teachings of the present invention. More specifically, when the properties of adhesives 1 and 3, prepared with the 900 melt index EnBA, were compared with adhesives 2 and 4, prepared with 900 melt index EVA, their superior performance under freezer conditions are apparent. In addition to the superior adhesion, the EnBa containing adhesives exhibited longer open time (tack range) as well as lower coating viscosities.

Example II

A similar comparison was done using slightly different formulations as indicated below.

| ADHESIVE COMPONENTS | 5 | 6 |
|---|---|---|
| EnBA (33% nBA, 900 MI) Escorene VW 22 | — | 37 |
| EVA (28% VA, 900 MI) Elvax 205 (Du Pont) | 37 | — |
| Brazilian Gum Rosin | 10 | 10 |
| 185° F. Microcrystalline Wax (Be Square 185) | 27 | 27 |
| Tackifying Resin 40° C. Rosin Ester (Sylvatac 40N) | 22 | 22 |
| Ethylene Vinyl Acetate Wax (AC 400) | 4 | 4 |
| Antioxident Irganox 1010 (Ciba-Geigy) | 0.5 | 0.5 |
| TEST RESULTS | 5 | 6 |
| Viscosity @ 250° F. (cps) | 1725 | 1495 |
| Viscosity @ 275° F. (cps) | 1125 | 990 |
| ADHESION (POLYETHYLENE LAMINATION) | | |
| RT | 100% | 100% |
| 40° F. | 50, 0% | 100% |
| 20 | 0% | 75% |
| 0 | 0% | 25, 100% |
| −30 | 0, 0% | 100, 75% |
| ADHESION (CORRUGATED) | | |
| RT | 100% | 100% |
| 40° F. | 100% | 100% |
| 20 | 25, 50% | 100% |
| 0 | 10, 50% | 100% |
| −30 | 0% cold crack | 100% |
| ADHESION (KRAFT/KRAFT) | | |
| RT | 100% | 100% |
| 40° F. | 100% | 100% |
| 20 | 100% | 100% |
| 0 | 100% | 100% |
| −30 | 100% | 100% |

Again, the results (which in some cases were repeated) indicate the overall superior properties obtained by the use of the 900 melt index EnBA (Adhesive 6) over comparable melt index grades of EVA (Adhesive 5).

Example III

For comparison purposes, a sample of hot melt adhesive prepared according to Brady U.S. Pat. No. 4,874,804 was evaluated to determine its viscosity at 250° F. The viscosity was found to be 14,250 cps. rendering that material unsuitable for application at the relatively low temperatures used herein. (In contrast, adhesives prepared above in accordance with the teachings of the present invention exhibited viscosity at 250° F. of less than about 2000 cps.)

We claim:

1. A carton, case or tray formed utilizing a hot melt adhesive composition said adhesive consisting essentially of:
   a) 10 to 60% by weight of at least one ethylene n-butyl acrylate copolymer containing 25 to 45% by weight n-butyl acrylate and having a melt index of at least about 850;
   b) 20 to 60% of a rosin ester tackifying resin selected from the group consisting of gum rosin, wood rosin, tall-oil rosin, distilled rosin, hydrogenated rosin, dimerized rosin, polymerized rosin, the glycerol ester of pale wood rosin, the glycerol ester of hydrogenated rosin, the glycerol ester of polymerized rosin, the pentaerythritol ester of hydrogenated rosin and the phenolic-modified pentaerythritol ester of rosin;
   c) 10 to 50% by weight of a microcrystalline or paraffin wax having a melting point of 150° to 200° F.; and
   d) 0 to 20% by weight of a polymeric additive selected from the group consisting of ethylene vinyl acetate containing 10 to 40% by weight vinyl acetate, ethylene methyl acrylate polymers containing 10 to 28% methyl acrylate, ethylene acrylic acid copolymers having an acid number of 25 to 150, polyethylene, polypropylene, poly-(butene-1-co-ethylene), and lower melt index ethylene n-butyl acrylate copolymers;
   e) 0 to 1.5% stabilizer;
said adhesive having a viscosity at 250° F. less than 2000 cps.

2. The carton, case or tray of claim 1 wherein the ethylene/n-butyl acrylate copolymer in the adhesive contains 20 to 40% n-butyl acrylate.

3. The carton, case or tray of claim 1 wherein the ethylene/n-butyl acrylate copolymer in the adhesive has a melt index of at least about 900.

4. The carton, case or tray of claim 1 wherein the tackifying resin in the adhesive has a melting point of 10° to 120° C.

5. The carton, case or tray of claim 1 wherein the adhesive contains a blend of an ethylene/n-butyl acrylate copolymer having a melt index of 900 and an ethylene/n-butyl acrylate copolymer having a melt index of 300.

6. The carton, case, or tray of claim 1 where there is up to 15% by weight of a polymeric additive selected from the group consisting of ethylene vinyl acetate polymers containing 10 to 40% by weight vinyl acetate; ethylene methyl acrylate polymers containing 10 to 28% by weight methyl acrylate, ethylene acrylic acid copolymers having an acid number of 25 to 150, polyethylene, polypropylene, poly (butene-1-co-ethylene) polymers and lower melt index ethylene n-butyl acrylate copolymers.

7. A carton, case or tray formed utilizing a hot melt adhesive composition said adhesive consisting essentially of:
   a) 10 to 60% by weight of at least one ethylene n-butyl acrylate copolymer containing 25 to 45% by weight n-butyl acrylate and having a melt index of at least about 850;
   b) 20 to 60% of a rosin ester tackifying resin selected from the group consisting of gum rosin, wood rosin, tall-oil rosin, distilled rosin, hydrogenated rosin, dimerized rosin, polymerized rosin, the glycerol ester of pale wood rosin, the glycerol ester of hydrogenated rosin, the glycerol ester of polymerized rosin, the pentaerythritol ester of hydrogenated rosin and the phenolic-modified pentaerythritol ester of rosin;
   c) 10 to 50% by weight of a microcrystalline or paraffin wax having a melting point of 150° to 200° F.; and
   d) 0 to 20% by weight of a polymeric additive selected from the group consisting of ethylene vinyl acetate containing 10 to 40% by weight vinyl acetate, ethylene methyl acrylate polymers containing 10 to 28% methyl acrylate, ethylene acrylic acid copolymers having an acid number of 25 to 150, polyethylene, polypropylene, poly-(butene-1-co-ethylene), and lower melt index ethylene n-butyl acrylate copolymers;
   e) 0 to 1.5% stabilizer;
said adhesive characterized by a viscosity at 250° F. less than 2000 cps.

8. The adhesive of claim 7 wherein the ethylene/n-butyl acrylate copolymer in the adhesive contains 20 to 40% n-butyl acrylate.

9. The adhesive of claim 7 wherein the ethylene/n-butyl acrylate copolymer has a melt index of at least about 900.

10. The adhesive of claim 7 wherein the tackifying resin has a melting point of 10° to 120° C.

11. The adhesive of claim 7 containing a blend of an ethylene/n-butyl acrylate copolymer having a melt index of 900 and an ethylene/n-butyl acrylate copolymer having a melt index of 300.

12. The adhesive of claim 7 containing up to 15% by weight of a polymeric additive selected from the group consisting of ethylene vinyl acetate polymers containing 10 to 40% by weight vinyl acetate; ethylene methyl acrylate polymers containing 10 to 28% by weight methyl acrylate, ethylene acrylic acid copolymers having an acid number of 25 to 150, polyethylene, polypropylene, poly(butene-1-co-ethylene) polymers and lower melt index ethylene n-butyl acrylate copolymers.

* * * * *